April 2, 1957  J. H. SCHULMAN ET AL  2,787,714
DOSIMETER FOR HIGH ENERGY RADIATION
Filed Nov. 28, 1952
EYE OR PHOTOTUBE
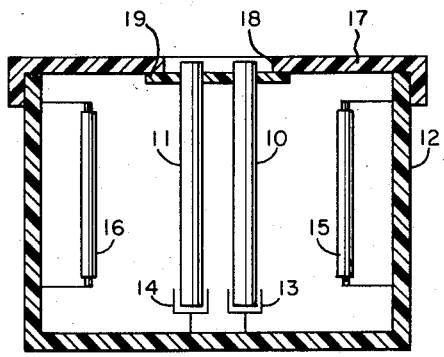
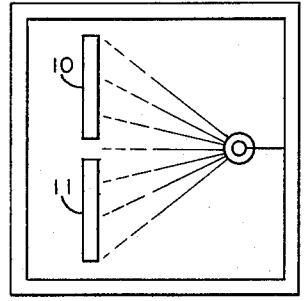
INVENTORS
JAMES H. SCHULMAN
ROBERT J. GINTHER
BY
ATTORNEYS

United States Patent Office 2,787,714
Patented Apr. 2, 1957

2,787,714

DOSIMETER FOR HIGH ENERGY RADIATION

James H. Schulman and Robert J. Ginther, Washington, D. C., assignors to the United States of America as represented by the Secretary of the Navy Application November 28, 1952, Serial No. 323,170

3 Claims. (Cl. 250—71)

(Granted under Title 35, U. S. Code (1952), sec. 266)

The present invention relates in general to dosimeters for measuring a total amount or dosage of high energy radiation such as X-rays, gamma-rays or radiation from radioactive or fissionable material. More particularly the invention relates to a dosimeter utilizing a radiophotoluminescent material such as a substantially transparent silver activated phosphate glass.

An object of the invention is the provision of a dosimeter utilizing a detecting element composed of a glass sensitive to high energy radiation and in such geometrical form as to enhance the readability of response of the detecting element by eye or by a photoelectric device.

Another object is the provision of a dosimeter system for high energy radiation in which means are provided for repeatedly evaluating the accumulated dosage taken up by a given detector element from time to time, the evaluations made on the same detector element and on different detector elements being made under identical circumstances whereby all factors except those varying in response to dosage remain substantially constant.

Another object is the provision of means for rendering the detector element as worn by personnel more uniformly responsive to radiation over the range of 80 kilovolts to 1.2 million volts effective.

Various other objects and advantages of the invention will become apparent from a perusal of the following specification and the drawings accompanying the same.

In the drawings:

Fig. 1 is a diagrammatic showing of a preferred form of a dosimeter system embodying the invention.

Fig. 2 is a diagrammatic showing of a modification in plan view with the cover removed.

Referring to the drawings in detail and first to Fig. 1, 10 is the detector element which according to the invention is of a suitable substantially transparent radiophotoluminescent material, such as silver activated phosphate glass in the form of a rod capable of being worn by personnel subjected to high energy radiation. Exposure of such a rod to high energy radiation produces a permanent change in the property of the material of the rod to fluoresce in response to excitation by radiation in the ultraviolet range, the degree of this change in fluorescence being a measure of the dosage of high energy radiation received by the rod. This change being permanent and undiminished by excitation of the rod to fluorescence, makes possible the repeated evaluation of the accrued dosage as taken up from time to time.

It has been found that this change in fluorescence can be most accurately observed by comparison with a standard rod 11 which may be an unexposed rod of the same material, but preferably one of a set of identical silver activated phosphate glass rods which have been dosed to different known values. As a modification, the standard rods may be identical in shape but of a different material such as normally fluorescent glass, the different rods in the set, by variation in composition, suitable optical shielding or other expedient, being made to fluoresce with the same color as the dosimeter rod but at different intensities representing the effect of different known dosages on the dosimeter rod.

To facilitate this comparison a light-tight casing 12 is provided in which a standard rod 11 and the dosimeter rod 10 may be held slightly spaced and in parallelism by suitable socket elements 13—14 secured in the casing 12. Mounted within the casing on opposite sides of the pair of rods are a pair of substantially identical ultraviolet lamps 15—16. The lamps and rods may be mounted in a common plane as shown, with each lamp spaced the same distance from its adjacent rod, or the lamps may be placed in any other position symmetrical with the center line or line of symmetry of the group of rods 10 and 11. Any arrangement of lamps or a single lamp whereby both rods will receive the same amount of ultraviolet irradiation from both or a single source will suffice. For example, where one lamp is used, the two rods may be placed equidistant from the one lamp.

One side or wall of the casing, formed as a removable cover 17, is provided with an opening 18 at the free ends of the rods to permit simultaneous observation of the ends of both rods by eye, or detection of light emanating from each rod in sequence by a photo tube, for purpose of comparison. Where electrical translating means such as a photo tube for detecting and translating variations in light intensity into corresponding electric current variations, such translating means may be arranged in any known or other suitable manner to control suitable known registering or recording means as will be understood by those skilled in the art.

It will be noted that because of the rodlike or three-dimensional form of the fluorescent material, there will be substantial internal reflection and scattering within the rod, of both the exciting and the fluorescent light, resulting in an output of fluorescent light to the eye or photo-tube representing an average of the intensities of such light received from different points in the rod.

Optionally a light-tight shield element 19 may be used to close all space between the sides of the tubes 10 and 11 and the opening 18.

With or without the shield element 19, any known or other suitable means may be used to exclude from the eye or photo tube all but the fluorescent light to be measured.

In use, the dosimeter rod 10 having been exposed to high energy radiation as by having been worn on the person of an individual so exposed, is placed in the light-tight casing 12 and together with the standard rod 11 is subjected to irradiation by the ultraviolet lamp 15—16.

According to the kind of glass or crystal used for the rods, the exposure of the dosimeter rod 10 to high energy radiation has increased or decreased the original fluorescence of the rod, the degree of which variation is a measure of the dosage of high energy radiation received by the dosimeter rod. This change is more readily seen by viewing the rods along their axes, affording a more discriminating comparison of the fluorescent light emanating from the two rods than by looking normal to their axes, or by looking at a similarly treated powdered plaque of the material.

It will be understood that the ultraviolet sources 15—16 may be of any known or other suitable type capable of producing radiation in substantially the ultraviolet range. By the term ultraviolet range is meant a range from about 2,000 angstroms to about 4,000 angstroms. Radiation including substantially all or a portion of this range has been found suitable for exciting the rods to fluorescence. Practice shows that for silver activated phosphate glass a range of from 3,000 angstroms to 4,000 angstroms to be preferable, 3,650 angstroms being close to optimum.

In the region of low X-ray energies or so-called soft X-rays, corresponding to photoelectric absorption of X- rays, the silver activated phosphate glass is much more sensitive than in the region of higher energies where absorption is principally by the Compton effect. This energy dependence can be reduced to plus or minus 20 percent over the range of 100 kilovolts to 1.2 million volts equivalent by encasing the glass in appropriate metal filters.

It is to be noted in passing that the rods 10 and 11 may be either rectangular or circular in cross section. An advantage of the use of rods of noncircular section as diagrammed in Fig. 2, is that one pair of opposite sides may be made much larger than the others as in the case of a rectangular slab so as to afford a relatively large surface for exposure to the ultraviolet source. In practice a plate or slab in the neighborhood of 1 x 1 x 0.1 centimeters has been used. For wear by personnel as a dosimeter this would be encased in a light-tight container and surrounded by an appropriate metal filter. Also to make measurement of the fluorescent light easier, larger dimensions in the order of inches have been used.

Among suitable radiophotoluminescent materials other than those specifically mentioned above are; silver activated borate glass, several alkali halides and potassium sulfate activated by silver or cadmium.

While certain specific embodiments of the invention have herein been described for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. A dosimeter system comprising a solid slab of silver bearing phosphate glass having been irradiated with high energy radiation of unknown quality having a pair of sides of relatively large and small area lying normal to each other, means for irradiating substantially the entire large area with radiation of a given intensity and wave length in the ultraviolet range, means for measuring the average intensity of fluorescent light emitted from the small area side, and means excluding outside visible light from said slab of glass.

2. A dosimetric system comprising a pair of solid bars of radiophotoluminescent material, one of said bars having received a dosage of high energy radiation to be measured and the other a known dosage of the same kind of radiation, means for irradiating both said bars each with radiation of the same given intensity and wave length capable of exciting the glass to fluorescence, and a housing of opaque material surrounding said bars and irradiating means except for an opening in the housing positioned relative to said bars to permit radiation of fluorescent light from an end of each bar out of the housing for purpose of comparison.

3. A dosimeter system comprising a solid bar of radiophotoluminescent material having a relatively large side area and a relatively small end area substantially normal to each other and having received a dosage of high energy radiation to be measured, a second bar of the same geometry as the first bar and of fluorescent material normally fluorescing at the same color as said first bar and at a given intensity equal to the intensity of fluorescence of a bar of the material of said first bar having a dose of high energy radiation of a given magnitude, means for irradiating both said bars with radiation capable of exciting said bars to fluorescence, and a housing of opaque material surrounding said bars except for openings in the housing positioned relative to said bars to permit radiation of fluorescent light from only an end of each bar out of said housing for purpose of comparison.

References Cited in the file of this patent

UNITED STATES PATENTS

| | | |
|---|---|---|
| 2,403,631 | Brown | July 9, 1946 |
| 2,435,843 | Rand | Feb. 10, 1948 |
| 2,451,885 | Stevens et al. | Oct. 19, 1948 |
| 2,524,839 | Schulman et al. | Oct. 10, 1950 |
| 2,585,551 | Hofstadter | Feb. 12, 1952 |
| 2,616,051 | Daniels | Oct. 28, 1952 |
| 2,624,011 | Stern | Dec. 30, 1952 |
| 2,730,625 | Shurcliff | Jan. 10, 1956 |
| 2,750,515 | Shurcliff | June 12, 1956 |